(No Model.) 2 Sheets—Sheet 1.
J. A. CROSSMAN & N. C. BUCH.
SAW SWAGING MACHINE.
No. 363,730. Patented May 24, 1887.
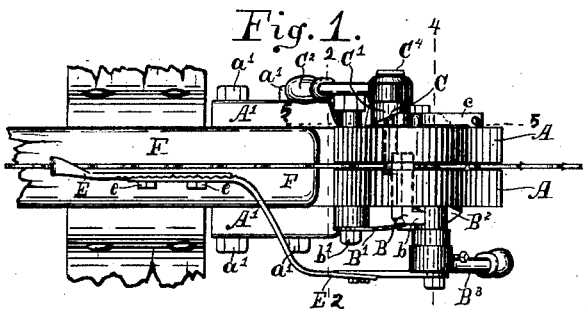
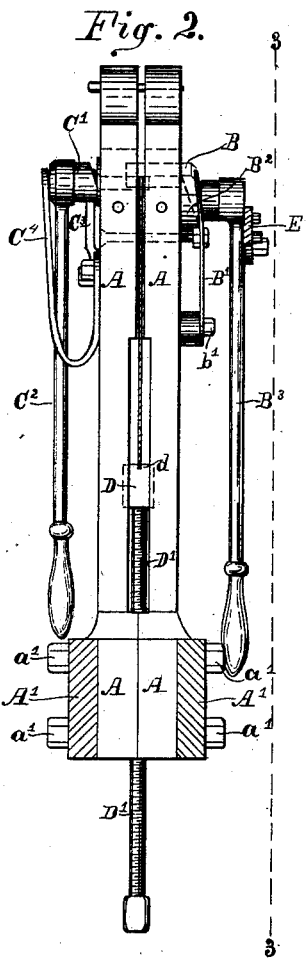
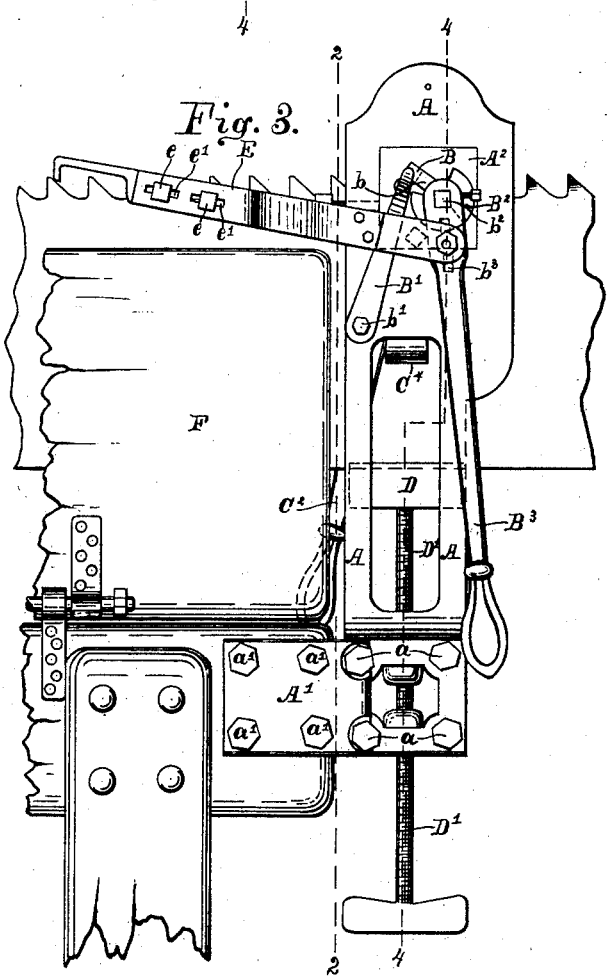
WITNESSES.
Chas. A. Suffrins,
E. M. Bradford.
INVENTOR.
John A. Crossman
Nelson C. Buch
PER
C. Bradford
ATTORNEY.

(No Model.) 2 Sheets—Sheet 2.
J. A. CROSSMAN & N. C. BUCH.
SAW SWAGING MACHINE.
No. 363,730. Patented May 24, 1887.
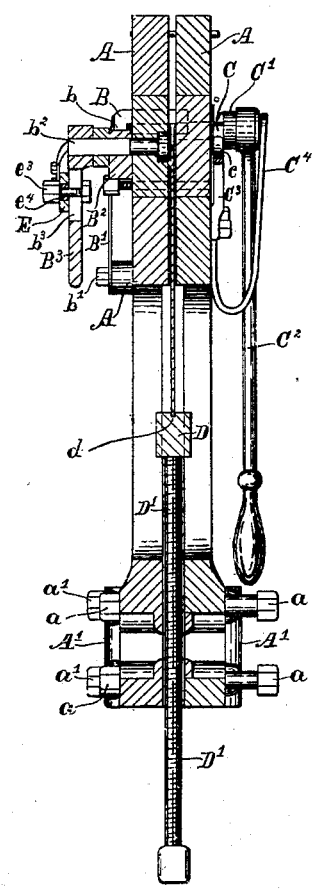
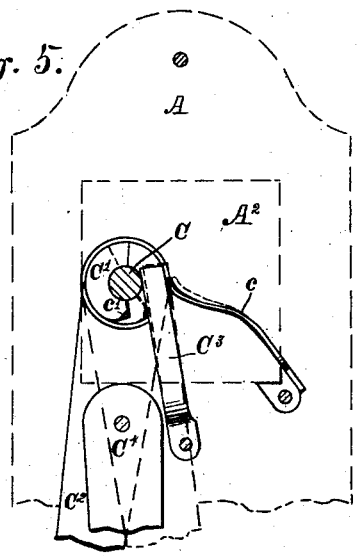
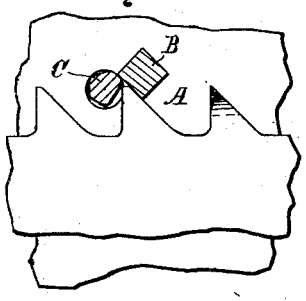
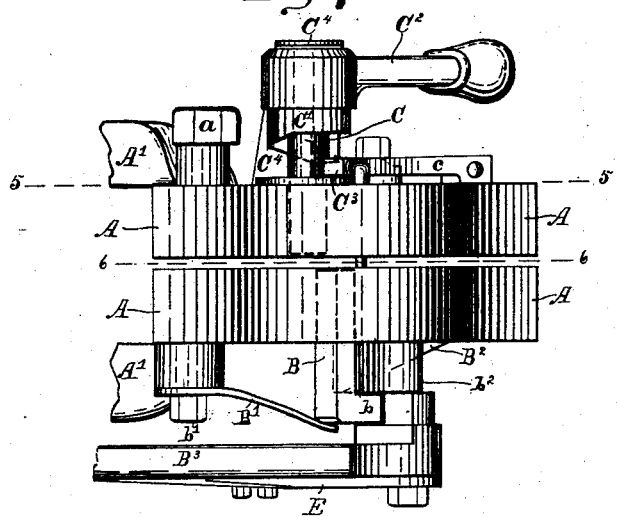
WITNESSES.
Chas. A. Suffrins,
E. W. Bradford.
INVENTOR.
John A. Crossman
Nelson C. Buch
PER
C. Bradford
ATTORNEY.

UNITED STATES PATENT OFFICE.

JOHN A. CROSSMAN AND NELSON C. BUCH, OF INDIANAPOLIS, INDIANA, ASSIGNORS TO E. C. ATKINS & COMPANY, OF SAME PLACE.

SAW-SWAGING MACHINE.

SPECIFICATION forming part of Letters Patent No. 363,730, dated May 24, 1887.

Application filed August 27, 1886. Serial No. 211,964. (No model.)

*To all whom it may concern:*

Be it known that we, JOHN A. CROSSMAN and NELSON C. BUCH, of the city of Indianapolis, county of Marion, and State of Indiana, have invented certain new and useful Improvements in Saw-Swaging Machines, of which the following is a specification.

Heretofore in the operation of swaging saws it has been necessary, before submitting the saw-tooth to the operation of swaging, to clamp it between appropriate jaws to secure it in the desired position in relation to the dies, thus making it necessary to unclamp said saw each time a tooth was swaged, withdraw it from the dies, and place and secure it and each succeeding tooth in position in like manner before operating upon it, thus making the operation of swaging not only slow and tedious, but also making the sides of the saw-teeth rough and upsetting them to a certain extent, by reason of the great pressure of the holding-clamp upon them.

The object of our present invention is to provide a swaging-machine wherein the saw will be secured in position without the aid of the clamp, and by which, as each tooth is operated upon, the succeeding tooth will be automatically drawn into position to be swaged. We accomplish this object by providing a suitable frame wherein the saw may slide, and mounting therein an adjustable set of swaging-dies arranged to engage with the points of the saw-teeth when the saw is in place, which may be slid back and forth out of the path of the saw, and thus permit said saw to slide freely without changing its position, as will be hereinafter more particularly described.

Referring to the accompanying drawings, which are made a part hereof, and on which similar letters of reference indicate similar parts, Figure 1 is a top or plan view of a saw-swaging machine embodying our said invention, the dies being shown in operative position; Fig. 2, a front elevation of the same, looking to the right from the dotted line 2 2 in Figs. 1 and 3; Fig. 3, a side elevation, looking to the left from the dotted line 3 3 in Fig. 2; Fig. 4, a vertical section, looking to the left from the dotted line 4 4 in Figs. 1 and 3; Fig. 5, a view, looking upwardly from the dotted line 5 5 in Fig. 1, the whole lines representing the position of the cam and lever after a tooth has been swaged, and the dotted lines representing their position when the die is withdrawn, the supporting-frame being also shown in dotted lines; Fig. 6, a detail view showing the position of the saw-tooth and dies when in position for operation; and Fig. 7, a detail view similar to a portion of Fig. 1, the dies and operating mechanism being in the position occupied when the dies are drawn out to permit the saw to slide along to the next tooth.

In said drawings, the portions marked A represent the supporting-frame; B, the anvil or female die; C, the operating or male die; D, an adjustable rest for the saw; E, an arm for moving the saw, and F a frame-work for steadying the saw laterally.

The supporting-frame A consists, preferably, of two uprights of sufficient size and strength for the purpose. At their lower ends they are secured together by bolts $a$, and have flanges A' extending forward and bolted to the bench or other device to which it is desired to secure the machine by the bolts $a'$. Their inner faces are recessed sufficient to leave a way of sufficient width to easily permit the saw to slide between them. At their top they are preferably formed with an opening, which is filled with a block of steel, $A^2$, or other material suitable to form bearings for the operating mechanism.

The anvil B is preferably a square straight piece of steel, mounted to slide in a suitable seat or bearing formed in the part $A^2$ at the top of the supporting-frame. It is of sufficient length to extend through one side of said frame across the path of the saw and a short distance into the opposite side, (see dotted lines in Figs. 1 and 2,) its seat or bearing being formed of a corresponding depth. On its outer end is formed a lip, $b$, having a cam-shaped inner surface, as shown. It is held in operative position by a spring, B', secured to the frame by a bolt, $b'$, arranged to bear against its outer end and press inwardly. A screw-cam, $B^2$, formed or secured on the stud-shaft $b^2$, mounted in appropriate bearings in said part A², is arranged to engage with said lip b of the anvil, as shown, and thus draw it out from across the path of the saw when desired, as will be presently described, a lever, B³, being mounted on the end of said shaft b² for operating it.

The operating-surface of the die C is of the form shown in our Patent No. 343,658, granted June 15, 1886, and its use and operation are as therein described, and need not therefore be particularly described in this application, which relates to the other parts of the machine. It is mounted to slide and operate in a suitable bearing in the part A², at the top of the supporting-frame A, extending in from the part of said frame opposite to that in which the anvil is mounted across the recess between the two parts and into the opposite side a short distance, as shown. On its outer end it is provided with a screw-cam, C', and a handle or lever, C², by which it is operated. A bearing part, C³, is pivoted at its lower end to the frame, and its upper end is arranged to rest against the face of said cam C' and serve as a fulcrum over which it operates in withdrawing said die C, as will be readily understood, a spring, c, being arranged to hold it in this position. At the end or point of the cam C' is provided a shoulder or notch, c', (see Fig. 5,) into which said fulcrum C³ drops as the die is turned out to that point where it is sufficiently withdrawn from its bearing. Thus, as it is started back, said shoulder operates to throw said fulcrum out of engagement with the face of the cam and notch and permits a spring, C⁴, secured to the frame to bear against the outer end of the die, as shown, to throw said die C into operative position at once, and thus it begins to operate upon the saw-tooth immediately as it commences to rotate, and as it is turned in its bearing the open side of the cam comes up, and the fulcrum or bearing part C³ drops into position (shown in whole lines in Fig. 5) to engage with the face of the cam.

The rest D is simply a block formed with tenon-shaped ends and mounted to slide in the vertical ways between the uprights forming the supporting-frame, and is provided with a groove, d, in its top to receive the back of the saw. It is supported in position on top of a screw-threaded rod, D', mounted and operating in a screw-threaded vertical hole through the lower end of the frame-work, as shown.

The arm E is adjustably secured in a slot, b³, in the lever B³, and extends forward, and is provided with a hooked outer end adapted to engage with the teeth of the saw. It is preferably composed of two parts having serrated contiguous faces, secured together by bolts e, passing through the slots e' in said parts, thus permitting said hooked end to be readily adjusted or lengthened out to the position required for its perfect operation. It is adjustably mounted in the slot b³ of the lever, a box or collar e⁴, of slightly greater length than the thickness of said arm, being mounted on the bolt e³, which secures the arm in place and, forming the bearing for said arm, thus permitting the nut on said bolt to be screwed up sufficiently tight to hold the bolt in the position which it is desired for the end of the lever to occupy, and at the same time permit its free operation on the bolt, as will be readily seen.

The frame F is any suitable frame secured to the bench along each side of the saw for the purpose of supporting and steadying it in position while being operated upon by the machine.

The operation of our said invention is as follows: The saw being first mounted on the rest D, and said rest being adjusted to bring the teeth of the saw into the required position in relation to the dies, and the arm E adjusted in length and in relation to the pivot of the lever B³, to give it the proper length of stroke to correspond with the distance between the teeth, the lever B³ is turned back from the position shown in Fig. 7 to that shown in Fig. 1 and the remaining figures, permitting the anvil B to slide into operative position, and, through the arm E, drawing the saw-tooth back against said anvil. The lever C² is then started back from the position shown in Fig. 7, and in dotted lines in Fig. 5, when the shoulder c' operates to disengage the part C³ from the cam, as before described, and permit the spring C⁴ to push said die C into position for operating upon the tooth, the parts then occupying the position thown in Fig. 6. Said die is then turned to the position shown in Fig. 1, its several cam-faces operating to swage said teeth in the same manner as described in our aforementioned Letters Patent. It is then turned back, which operation withdraws it from the path of the saw, as before described. The lever B³ is again thrown forward, withdrawing the anvil also from the path of the saw, and is then drawn back, the arm E engaging with the next tooth and drawing the saw back a sufficient distance to bring another tooth to a position against the anvil, the swaged tooth passing back of said anvil while it is withdrawn, and the anvil reaching its position again before the succeeding tooth reaches it, as will be readily understood. Thus the operation of swaging is made very simple and rapid, and the teeth rigidly secured during the operation without the use of any clamping devices upon them.

It will be understood, of course, that while we have shown the cam mechanism for operating the dies, any means which would do the work would answer the purposes of this invention, or they might even be withdrawn by hand without departing from our invention.

Having thus fully described our said invention, what we claim as new, and desire to secure by Letters Patent, is—

1. In a saw-swaging machine, swaging-dies mounted to slide in their bearings, whereby they may be withdrawn from operative position to release the saw-tooth, substantially as set forth.

2. In a saw-swaging machine, operating-dies arranged to be slid into a position one on either side of the point of the saw-tooth to be swaged, and means for withdrawing them from said position after the operation is performed, substantially as set forth.

3. The combination, in a saw-swaging machine, of the frame A, consisting of two uprights with a way between them, the adjustable saw-support D, sliding anvil B, and operating-die C, and means for operating said die, substantially as set forth.

4. In a saw-swaging machine, the combination of the frame A, sliding anvil B, screw-cam $B^2$, operating-die C, having a screw-cam, C', and the pivoted part $C^3$, all arranged and operating substantially as set forth.

5. The combination, in a saw-swaging machine, of the supporting-frame, the sliding anvil B, provided with the lip $b$, the spring B', arranged to bear against the outer end of said anvil, the cam $B^2$, mounted to engage with said lip $b$ of said anvil, the operating-die C, provided with a cam, C', pivoted part $C^3$, and the spring $C^4$, all substantially as set forth.

6. In a saw-swaging machine, the combination of the supporting-frame, the operating-dies mounted to slide therein, the support D for the saw, and an arm, E, pivoted at one end to an operating-lever and formed at the other end to engage with the teeth of the saw, substantially as described, and for the purposes specified.

7. In a saw-swaging machine, the combination, with the swaging mechanism and operating-lever $B^3$, of an arm, E, adjustably pivoted to said lever at one end and formed to engage with the saw-tooth at the other, said arm E being formed in two parts adjustable upon each other, substantially as set forth.

8. In a saw-swaging machine, the combination of a frame for supporting the operating mechanism, an adjustable rest for the back of the saw, and sliding swaging-dies arranged above said adjustable rest to engage with the teeth of said saw, and means for operating them, whereby said saw is firmly held between said rest and said dies without other clamping devices, substantially as set forth.

9. A rotary die for saw-swaging machines, mounted to slide into position to operate upon the saw-tooth after said tooth is adjusted to position, and be withdrawn therefrom after the operation, substantially as set forth.

In witness whereof we have hereunto set our hands and seals, at Indianapolis, Indiana, this 21st day of August, A. D. 1886.

JOHN A. CROSSMAN. [L. S.]
NELSON C. BUCH. [L. S.]

In presence of—
E. W. BRADFORD,
CHARLES L. THURBER.